United States Patent [19]

D'Atre et al.

[11] 4,215,304

[45] Jul. 29, 1980

[54] MOTOR/BRAKE TRANSITIONING FOR AN INVERTER DRIVEN A-C INDUCTION MOTOR

[75] Inventors: John D. D'Atre, Ballston Lake, N.Y.; Dennis F. Williamson, Kingston, Canada

[73] Assignee: General Electric Company, Erie, Pa.

[21] Appl. No.: 948,193

[22] Filed: Oct. 2, 1978

[51] Int. Cl.² .............................................. H02P 5/40
[52] U.S. Cl. .................................. 318/758; 318/803; 318/808
[58] Field of Search ................ 318/757, 758, 798–803, 318/805, 807–812

[56] References Cited

U.S. PATENT DOCUMENTS

| 3,899,725 | 8/1975 | Plunkett ........................... 318/758 X |
| 4,088,934 | 5/1978 | D'Atre et al. .................... 318/808 X |

Primary Examiner—Gene Z. Rubinson
Attorney, Agent, or Firm—J. H. Beusse

[57] ABSTRACT

Dynamic response of an a-c induction motor control system including an adjustable frequency and adjustable magnitude power source is made more stable during the transition from a motoring to an electrical braking mode by modifying the system characteristics as a function of rate of change of motor flux and torque magnitude during electrical braking. The control system responds to a torque command signal and a torque feedback signal to generate an error signal which controls the frequency of the excitation supplied to the motor and thus the torque developed by the motor. During electrical braking this error signal is modified as a direct function of the rate of change of motor flux and as an inverse function of the magnitude of torque developed by the motor. During the transition from motoring to electrical braking, when the system tends to be unstable, the rate of change of flux is relatively high while the motor torque is at a relatively low value. Accordingly, the error signal becomes very large in magnitude and rapidly forces the control system and motor out of the transition zone into a more stable operating zone. Once stabilized, modification of the error signal becomes negligible.

7 Claims, 4 Drawing Figures

MOTOR/BRAKE TRANSITIONING FOR AN INVERTER DRIVEN A-C INDUCTION MOTOR

BACKGROUND OF THE INVENTION

This invention relates generally to an improved regulating system for stabilizing the operation of a current fed induction motor drive system and, more particularly, to a system for stabilizing motor operation during the transition from a motoring or propulsion mode to an electrical braking mode.

An induction motor typically comprises a squirrel cage or wound rotor that is mounted in a stator having windings connected to a suitable source of excitation. Excitation of the stator windings creates a magnetic flux across the stator-rotor air-gap of the motor and the current induced in the rotor interacts with the air-gap flux to produce an electromagnetic force or torque tending to move the rotor relative to the stator. The amount of torque developed by the motor is often expressed in terms of the magnitude of the air gap flux and the slip frequency between stator and rotor. The effective slip frequency by definition is the difference between the frequency of the flux wave on the air gap and the equivalent electrical frequency at which the motor shaft is rotating (i.e., motor speed). Where such a motor is required to run at variable speeds with variable loads and in both forward and reverse directions, as in the case of traction motors for electrically propelled vehicles, the stator windings are advantageously supplied with polyphase a-c power which is so conditioned that the frequency as well as the amplitude of the stator excitation are adjustable as desired and the phase sequence is reversible.

A review of control systems for current fed induction motor drives is provided in U.S. Pat. No. 4,088,934 issued for J. D. D'Atre, T. A. Lipo, and A. B. Plunkett and assigned to General Electric Company. That patent teaches stabilizing a current fed induction motor drive system by controlling the excitation source of the motor as a function of the actual phase angle between the air gap flux and the stator current in the motor. The control system varies the frequency of the current supplied to the stator so as to regulate the phase angle to a desired value. In addition, the magnitude of air-gap flux is directly monitored and the magnitude of excitation applied to the stator is controlled so as to regulate the magnitude of air-gap flux to a desired value.

When the aforementioned system is operated in an electrical braking mode, it has been found that the system exhibits more stable characteristics if the magnitude of stator current rather than the magnitude of air-gap flux is regulated to a desired value. However, in the transition region, typically at slip frequencies between plus and minus three Hertz, the slope of the torque versus slip characteristic for any particular regulated current magnitude is relatively steep. In other words, torque magnitude may vary from zero to its maximum value with only a 3 Hz variation in slip frequency. Furthermore, the motor characteristic for constant current operation is a two-value function, i.e., for a given magnitude of stator current, two different distinct values of slip frequency will result in the same torque output. Satisfaction of the desired torque output in the transition region is difficult since very small slip frequency variations result in very large torque variations. Accordingly, operation at less than 3 Hz may be unstable and result in undesirable torque oscillations.

OBJECT OF THE INVENTION

It is an object of the present invention to improve the stabilization of a current-fed induction motor control system during transition from a motoring to an electrical braking mode.

SUMMARY OF THE INVENTION

In one aspect of the present invention there is provided a control system for an a-c induction motor having a first feedback control loop responsive to signals representative of the rotational velocity of the rotor of the motor, the magnitude of torque developed by the motor, and the magnitude of flux generated in the motor for regulating the magnitude of a-c power supplied to the motor from a variable magnitude and variable frequency power source. A second feedback control loop responsive to the same feedback parameters and additionally responsive to a torque command signal adjusts the frequency of the a-c power to achieve the commanded torque output. During motoring the first control loop utilizes a flux feedback signal such that the motor torque is regulated on a flux characteristic curve. However, when electrical braking is commanded, the first control loop is switched such that stator current becomes the controlling feedback parameter and the motor torque is regulated on a stator current characteristic curve. The transition from motoring to electrical braking also modifies the second control loop by switching from a simple filter path to a more complex quadrature filter and summing junction path whereby a compensation signal can be inserted into the loop for modifying the loop response as a function of rate of change of motor flux and magnitude of torque.

The compensation signal is generated by differentiation of a signal representative of the magnitude of flux in the motor and subsequently dividing the differentiated signal by a signal representative of the magnitude of torque developed by the motor. The compensation signal is applied to the summing junction where it is summed with a torque error signal, representative of the difference between commanded and actual torques, to thereby yield a modified torque error signal for controlling the frequency of the a-c power supplied to the motor. Since the rate of change of flux is of large magnitude during motor-to-brake transitioning, while the magnitude of torque is relatively small, the compensation signal is relatively large and creates a relatively large modified error signal which rapidly forces the control system through the transient characteristic to a more stable operating point, in effect making the system exhibit a single-value rather than double-value characteristic.

Once the transient region is passed, the rate of change of flux becomes small and the magnitude of torque becomes relatively large such that the magnitude of the compensation signal becomes insignificant. Thus the compensation signal is effectively non-existent when a stable motor operating point is reached.

BRIEF DESCRIPTION OF THE DRAWINGS

These and other features, advantages and objects of the present invention will become more readily apparent by reference to the following detailed description when taken in conjunction with the following drawings in which.

DESCRIPTION OF THE PREFERRED EMBODIMENT

Figure 1:
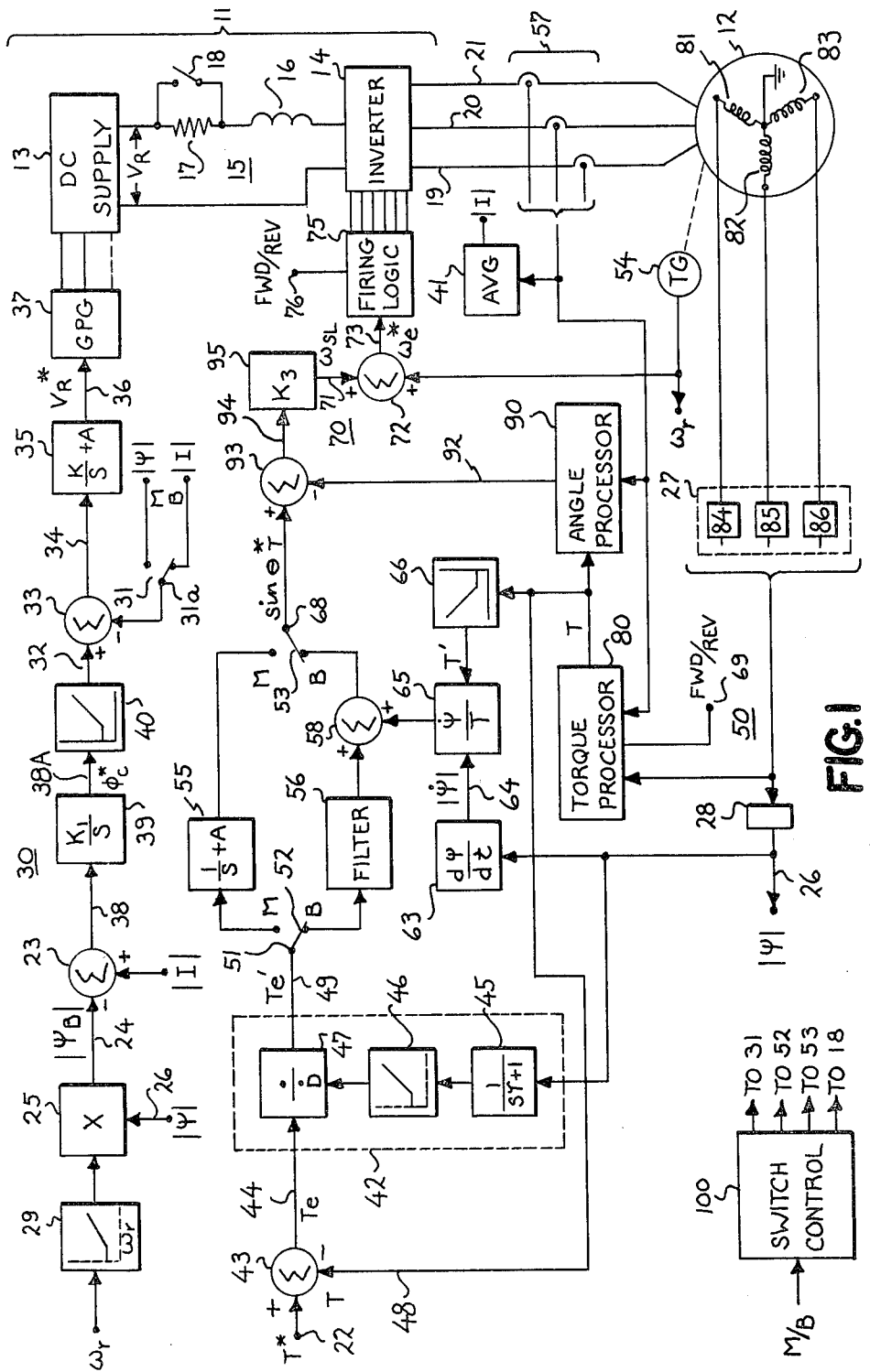
FIG. 1 is a functional block diagram illustrating an adjustable speed a-c electric motor drive system embodying our invention.

FIG. 1 shows a preferred embodiment of an electrical control system for an a-c electric motor. The specification will conclude with claims pointing out the particular features which are regarded as the subject matter of the present invention. In particular, the claims of this application are directed to apparatus for effecting a rapid transition from a motoring to an electrical braking mode and for forcing the control system to quickly pass through an instable operating zone to a stable portion of a torque/slip response characteristic for the a-c motor. Other features of the described system are claimed in co-pending patent applications filed concurrently herewith and assigned to the assignee of the present invention. The co-pending patent applications and their titles are as follows:

Ser. No. 948,194—Excitation Commanding For Current Fed Motor Drives

Ser. No. 948,192—Gain Normalization Technique For Controlled Current Induction Motor System Referring now to FIG. 1, our invention is shown embodied in an adjustable speed motor drive system basically comprising the combination of electric power conversion apparatus 11 and an adjustable speed a-c motor 12 having 3-phase wye or delta-connected stator windings (not shown) that are connected for energization to the polyphase output of the conversion apparatus 11 and having a rotor (not shown) coupled to a mechanical load such as the wheels of a traction vehicle (not shown). The apparatus 11 is suitably constructed and arranged to supply a-c power of variable frequency and amplitude to the stator windings of the motor 12. In its preferred embodiment, the conversion apparatus 11 has a front end comprising a controlled d-c power supply 13 adapted to be connected to an electric energy source (not shown), a back end comprising a variable frequency static electric power inverter 14 having d-c and a-c terminal sets, and a d-c link 15 interconnecting the d-c terminal set of the inverter 14 and the d-c terminals of the power supply 13. These more or less conventional parts of the illustrated motor drive system will now be briefly described, and following that description the concept and preferred implementation of our invention will be explained in detail. At the outset, however, it should be understood that our invention serves the primary purpose of stabilizing the operation of the motor 12, and it can be advantageously used for this purpose in motor drive systems different than the particular one illustrated in FIG. 1.

The d-c power supply 13 can take any one of variety of known forms, such as, for example, a d-c/d-c chopper whose input terminals are coupled to an uncontrolled d-c source, a phase controlled recitifier circuit coupled to a fixed magnitude a-c source, and an uncontrolled rectifier coupled to a variable magnitude alternating voltage source. By varying the duty cycle of the chopper or the firing angle of the electric valves forming the phase controlled rectifier circuit or the voltage amplitude of the alternating voltage source, as the case may be, the average magnitude of the direct current output voltage $V_R$ that the power supply 13 impresses on the d-c link 15 can be constrained between zero and some positive voltage as desired. Conventionally the d-c link 15 includes a suitable filter, shown in FIG. 1 as a simple inductor or choke 16, for smoothing the undulating direct current flowing between the power supply 13 and the inverter 14. However, in the illustrated system, the choke 16 may be omitted if the power supply 13 includes an alternator/rectifier and the inventive arrangement described in U.S. patent application Ser. No. 864,422 by D. F. Williamson, filed Dec. 27, 1977, and assigned to the General Electric Company is utilized. A dynamic braking resistor (DBR) 17 shunted by a dynamic braking contactor 18 is connected between the power supply 13 and the d-c link 15.

The inverter 14 may comprise any suitable conventional controlled current inverter (CCI). In the presently preferred embodiment of our invention, it is particularly advantageous to use a 3-phase autosequential commutated inverter and an improved form of such an inverter is disclosed and claimed in U.S. Pat. No. 3,980,941 granted to R. F. Griebel and assigned to the General Electric Company. The respective terminals of the 3-phase a-c terminal set of the inverter 14 are connected by way of three alternating current conductors or lines 19, 20, and 21 to the corresponding terminals of the 3-phase stator windings of the motor 12, and the inverter is operative to switch the d-c link current in sequence between the respective phases of the stator windings.

The motor 12 may be selected from a variety of conventional types known generally as induction, synchronous, and synchronous-reluctance, and it can be either round or linear. A round induction motor is assumed in the present description, it being understood that if a synchronous motor were used the source of excitation would additionally include suitable means for supplying direct current to the field windings. The motor drive system may comprise a single motor 12 as shown, or alternatively it may comprise a plurality of such motors, in which event separate inverters and d-c links may be provided for connecting the respective motors in parallel to a shared d-c power supply. While a 3-phase motor has been shown, the number of phases is not critical, and motors having fewer or more phases can be alternatively used if desired.

Figure 2A:
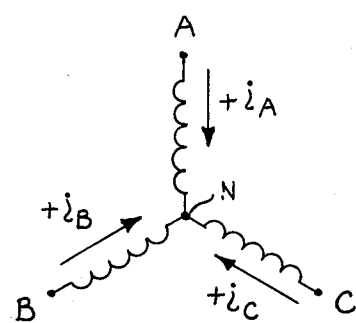
FIGS. 2A and 2B are, respectively, schematic diagrams of the stator windings and of the stator current waveforms in the 3-phase motor illustrated in FIG. 1.
Figure 2B:
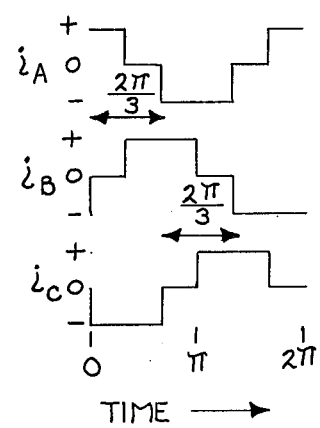

A wye-connected set of 3-phase stator windings of the illustrated motor 12 are shown schematically in FIG. 2A. Each winding comprises a plurality of main coils that are conventionally distributed in slots around the stationary magnetizable core of the motor and are electrically connected between a neutral N and the associated phase (A, B, or C) of the 3-phase power lines 19–21. The alternating currents $i_A$, $i_B$, and $i_C$ exciting the respective phases of the stator windings during one full cycle of operation are illustrated in FIG. 2B wherein the commutation intervals are idealized and ripple is neglected. It will be seen that a symmetrically staggered phase sequence A-B-C is assumed. In each phase the fundamental stator winding excitation current has the amplitude determined by the magnitude of current in the d-c link 15 and a frequency determined by the fundamental switching frequency of the electric valves in the inverter 14.

Referring again to FIG. 1, by appropriately controlling the motor excitation, the load that is driven by the motor 12 can be propelled (motoring mode) or retarded (braking mode, in which case the motor operates as a generator) in either forward or reverse directions as desired. Preferably the excitation control is exercised by varying the d-c supply voltage $V_R$ and the frequency and phase sequence of the polyphase a-c power that the inverter 14 supplies to the stator of the motor 12. Toward this end, suitable means is provided for regulating and controlling the operation of the conversion apparatus in response to an operator controlled input signal applied to input terminal 22, which signal is representative of a desired motor torque or horsepower. The feedback signals are representative of the actual motor responses, as is more fully explained below.

The control means comprises a pair of outer regulating loops 30 and 50. The first loop 30 exerts control over the d-c supply voltage $V_R$ in a manner to regulate the magnitude of stator excitation, whereas the second outer loop 50 exerts control over the frequency of the stator winding current in a manner to regulate motor torque.

The first outer loop 30 regulates the stator excitation of the motor 12 by so adjusting the average magnitude of the voltage $V_R$ impressed on the d-c link 15, which voltage in turn forces the link current and hence determines the amplitude of the fundamental stator winding current, as to minimize the error between an excitation magnitude feedback signal applied to a common terminal 31a of a switch 31 and a variable signal on line 32, which signals are summed in a summing junction 33. The loop 30 comprises an excitation regulator which derives, on line 34, an error signal representative of a desired change in d-c supply voltage $V_R$. As is shown in FIG. 1, the error signal on line 34 is processed by a conventional compensation network 35 having integral plus proportional transfer characteristics. From the gain network 35 a compensated signal $V^*_R$ is derived and fed over a line 36 to suitable control means 37 for the controlled d-c power supply 13.

The control means 37 controls the operation of the d-c power supply 13 and determines the average magnitude of the d-c link voltage $V_R$ in accordance with the compensated signal $V^*_R$. The control means 37 may comprise a gate pulse generator as is illustrated in U.S. Pat. No. 4,088,934 by D'Atre et al and assigned to the General Electric Company. Preferably, however, the control means 37 may comprise an exciter and alternator combination such as that shown in U.S. patent application Ser. No. 864,422 filed Dec. 27, 1977 by D. F. Williamson and assigned to the General Electric Company. It will be apparent that the first regulating loop 30 responds to any error between the excitation magnitude feedback signal applied to terminal 31a and a signal on line 32 to vary $V_R$ in a corrective sense, thereby increasing or decreasing the amplitude of stator excitation as necessary to reduce the value of the error toward zero.

The excitation magnitude feedback signal is intended to be representative of the actual level of excitation in the stator of motor 12. For example, it can be a measure of the average magnitude of the actual flux produced across the stator-rotor gap in the motor 12 when excited, in which case this feedback signal is preferably derived from the flux feedback signals as described hereinafter. Alternatively, the excitation magnitude feedback signal may be representative of the magnitude of stator current flowing in motor 12. In a preferred embodiment the switch 31 is provided to allow selection of either a flux magnitude feedback signal $|\psi|$ or a current magnitude feedback signal $|I|$. The determination of whether to use flux or magnitude current as a feedback reference is preferably based upon whether the motor 12 is being operated in a motoring or a retarding mode. When the motor 12 is operated in a motoring mode, the switch 31 is actuated such that the excitation feedback signal is derived from the flux feedback signal $|\psi|$. In the retarding mode, however, the switch 31 is actuated such that magnitude stator current $|I|$ becomes the excitation feedback signal. A discussion of the differences in operation as a result of the alternative use of flux or current excitation feedback referencing will be described infra with regard to FIG. 3.

The signal on line 32 is derived from a command signal $\phi^*_c$ representing the desired magnitude of stator excitation. This command signal $\phi^*_c$ is developed on line 38A and is supplied from an integrator 39 through a limiter circuit 40 to line 32. Limiter circuit 40 is included between lines 38A and 32 to prevent any deviation of the signal on line 32 below a predetermined minimum limit to thus maintain a minimum available motor excitation.

The $\phi^*_c$ signal is derived from a comparison of motor flux and stator current such that for any commanded value of motor torque, a preferred stable motor operating point is selected, i.e., for every desired torque level and input power condition the system derives the correct command for the proper excitation of the motor at the regulated torque level. The magnitude of air gap balancing flux signal $|\psi_B|$ is subtracted from the absolute magnitude of stator current in a summing junction 23 to produce a balancing signal on line 38. Excitation equilibrium is achieved at a point where balancing flux signal $|\psi_B|$ equals motor current $|I|$. Should the flux level in the motor decrease from the balance condition, a positive error is formed on line 38A commanding an increase in excitation until balance is again achieved, assuming that torque continues to be regulated by excitation frequency control. Clearly, the ratio of flux to stator current can be set at any desired value by suitably selecting the gain in the flux and/or current feedback channels prior to balancing in junction 23.

The air gap balancing flux signal $|\psi_B|$ is supplied on line 24 to junction 23 from a multiplying circuit 25 of a type well known in the art. A signal representative of the magnitude of air gap flux is coupled via line 26 to circuit 25 from a flux processing circuit 27 via an absolute value circuit 28 of a type well known in the art. The circuit 27 is described in U.S. Pat. No. 4,011,489—Franz et al. A signal representative of a multiplying factor is supplied to multiplying circuit 25 from function generator 29. The multiplying factor varies as a predetermined function of the actual angular velocity $\omega_r$ of the rotor of motor 12 and is utilized to generate a "weak field" condition, i.e., the multiplying factor increases above unity when rotor velocity exceeds a predetermined value so that the balancing flux signal $|\psi_B|$ then exceeds the actual flux feedback signal and forces a decrease in air gap flux while maintaining a relatively constant stator current. For a given torque command value, the angle between the flux field and the stator current will be regulated, thus resulting in a variation in slip frequency in order to reflect the change in the flux to current ratio. In other words, for every desired torque level and input power condition, there is a physically correct command for the proper excitation of the motor at the desired torque level. The illustrated system regulates torque at a desired level by controlling inverter frequency. Excitation equilibrium is achieved at a point where balancing flux signal $|\psi_B|$ equals motor current $|I|$. The function generator 29 produces a signal representative of a multiplying factor having a predetermined fixed value, such as unity, until the motor corner point is reached. The multiplying factor signal increases above the motor corner point thus causing the balancing flux signal $|\psi_B|$ to become larger than the air gap flux signal $|\psi|$. In effect, the increase in magnitude of balancing flux signal $|\psi_B|$ causes the motor 12 to be operated in what can be characterized as a field-weakened condition. The result is to vary the balance between flux $|\psi|$ and current $|I|$ as an inverse function of rotor angular velocity $\omega_r$ to thereby achieve a constant horsepower operation above motor corner point. A tachometer generator (TG) 54 is preferably used to furnish the rotor velocity signal $\omega_r$ to function generator 29.

The signal $|I|$, representative of the absolute magnitude of stator current, is derived by an absolute value and averaging circuit 41 of a type well known in the art. Averaging circuit 41 has as inputs stator excitation current feedback signals derived from an array of three current transformers 57 coupled to the respective a-c power lines 19, 20, and 21.

By controlling the excitation magnitude through balancing the measured air gap flux against the measured stator current, the system offers the capability of providing the proper excitation for continuous torque regulation without the complication of calculating an excitation command based on an assumed condition as has been done in the prior art. Furthermore, use of a weak field operation allows the motor to operate at higher speeds at a predetermined horsepower output without additional increases in d-c source voltage.

The second outer loop 50 regulates the motor torque by so adjusting the fundamental switching frequency of the inverter 14, which frequency determines the frequency of the fundamental stator winding current, as to minimize any difference between a torque feedback signal T on line 48 and the variable control signal T* (representing a desired motor torque) at terminal 22. This loop comprises a summing circuit 43 in which the feedback and control signals are compared to derive, on a line 44, a torque error signal $T_e$ that reflects any difference therebetween.

The error signal on line 44 is processed by a motor gain compensation network 42 which varies the magnitude of the torque error signal as a function of the magnitude of air gap flux in motor 12. Network 42 compensates for the apparent "gain" of the motor which is not constant but varies as a function of flux level, i.e., a large increase in torque will occur for a small change in slip frequency at high air gap flux levels whereas only a small change in torque will result from the same change in frequency at a low air gap flux level.

The network 42 includes a filter circuit 45 having an input terminal connected for receiving the flux signal $|\psi|$ from circuit 27 via absolute value circuit 28. The circuit 45 provides unity gain and transient filtering for the flux signal. From circuit 45 the filtered flux signal is coupled through a limiter circuit 46 to a divisor input terminal (D) of a divider circuit 47 of a type well known in the art. The limiter circuit 46 limits the minimum value of the divisor signal to a predetermined value to avoid a divide by zero difficulty. The limiter circuit 46 provides an output signal having the same magnitude as its input signal over the range from minimum to maximum output signal magnitude. In a preferred embodiment the maximum output signal magnitude is selected to correspond to one per unit flux. The minimum output signal is then selected to provide a 5-to-1 range, i.e., the minimum value signal corresponds to 20% of one per unit flux. The torque error signal on line 44 is applied to a dividend input terminal of divider circuit 47 whereby there is provided at an output terminal connected to a line 49 an error signal $T_e'$ representative of torque error divided by flux magnitude. This gain normalization provides a consistent torque loop response over the varied levels of excitation of the motor 12.

Line 49 is connected to a common terminal 51 of a dual position motor/brake switch 52, which is operatively coupled to a second motor/brake switch 53 whereby the compensated torque error signal is processed through a first path in the motoring mode and through a second path in the braking mode of operation. The details and advantages of the alternative paths will be explained hereinafter.

Whether the system is in a propulsion or a braking mode of operation, the compensated torque error signal produced at common terminal 68 of switch 53 is a command signal $\sin\theta^*_T$ for an inner motor stabilizing loop 70 and varies in response to variations of the control signal T*, tending to assume whatever value results in reducing the error between T* and T to zero. The inner loop 70 is responsive to the command signal at terminal 68 and supplies, on a line 71, an appropriate signal that preferably is combined at a summing point 72 with the motor speed feedback signal $\omega_r$ to derive, on line 73, an excitation frequency control signal $\omega^*_e$ representative of their algebraic sum. The speed feedback signal $\omega_r$ is produced by tachometer generator 54, which senses the actual angular velocity of the rotor of the motor 12. The excitation frequency control signal $\omega^*_e$, which differs from $\omega_r$ in an amount and in a sense determined by the value of the signal on line 71, is fed over line 73 to suitable control means 75 for the inverter 14. The control means 75 is operative to determine the fundamental switching frequency of the inverter 14, and hence the fundamental frequency of the stator winding current, in accordance with the value of $\omega^*_e$. Since the value of $\omega^*_e$ corresponds to the stator excitation frequency and the value of $\omega_r$ corresponds to the equivalent electrical frequency of the actual motor speed, the signal on line 71 represents steady state motor slip frequency $\omega_{s1}$.

The inverter control means 75, labeled "Firing Logic" in FIG. 1, is suitably constructed and arranged to supply to the respective electric valves in the inverter 14 a family of gate pulses that will fire the valves in a predetermined sequence and at a fundamental frequency determined by the value of the excitation frequency control signal $\omega^*_e$. The stator current conducting intervals of the inverter valves are thus initiated every cycle in a staggered pattern that results in waveforms similar to those shown in FIG. 2B where it can be observed that the intervals associated with phases B and C of the windings are phase displaced with respect to the phase A intervals by one-third and two-thirds, respectively, of a full cycle of the fundamental frequency. The phase sequence, and hence the direction of rotation of the motor 12, corresponds to the sequencing of the gate pulses and is practically determined by a forward/reverse command signal supplied from a control panel (not shown) and applied to the inverter control means 75 at terminal 76.

It will now be apparent that the outer regulating loop 50 responds to any difference between the torque feedback signal T on line 48 and the command signal T* on terminal 22 to vary the switching frequency of the inverter valves in a corrective sense, thereby increasing or decreasing the stator excitation frequency as necessary to reduce the value of the difference to zero. The torque feedback signal T on line 48 is intended to be representative of the actual magnitude and relative direction of the torque in the rotor of the motor 12 when excited. It can be derived from the motor by any suitable means.

Preferably the torque feedback signal T is obtained from the improved torque processing circuit 80 that is constructed and arranged in accordance with the teachings of U.S. Pat. No. 4,023,083 issued to A. B. Plunkett on 10 May 1977, and assigned to the General Electric Company. As is therein explained more fully, this component relies on stator excitation current feedback signals derived from the array of current transformers 57 coupled to the respective a-c power lines 19, 20, and 21, and it also relies on motor flux feedback signals derived from flux processing circuit 27 that senses the actual electro-magnetic flux across the rotor-stator gap inside the motor 12. The flux processing circuit 27 is advantageously constructed in accoreance with the teachings of a U.S. Pat. No. 4,011,489 issued to A. B. Plunkett and J. P. Franz on 8 Mar. 1977 and assigned to the General Electric Company. The disclosures of both of the patents cited in this paragraph are incorporated herein by reference.

As is more fully disclosed by Plunkett and Franz, the flux processing circuit 27 comprises a plurality of multi-turn coils 81, 82, and 83 mounted proximate to the main coils of the stator windings in preselected stator slots so as to sense the actual flux produced across the gap between the stator and the rotor of the motor 12 when the stator is excited, whereby each sensing coil has induced therein voltage signals substantially proportional to the rate of change of flux across the adjacent sector of the stator-rotor gap, and a plurality of integrating circuits 84, 85, and 86 respectively connected to the aforesaid sensing coils so as to produce flux feedback signals that are time integrals of the induced voltage signals, whereby both magnitude and phase of the actual stator-rotor gap flux are truly represented by the flux feedback signals.

As described in the aforementioned U.S. Pat. No. 4,088,934, the stability of the illustrated motor drive system under conditions of changing load is enhanced and the transient behavior of the system is generally improved by providing the above-mentioned inner loop 70 in the frequency control channel of the inverter 14 and by utilizing this loop to control the motor excitation as a function of the actual "torque angle" in the machine. By torque angle we mean the phase angle between two vectors that represent, respectively, the flux and currents that interact in the motor to develop an output torque. Because of its relative accessibility in the illustrated system, the phase angle between the stator current vector and the stator-rotor gap flux vector is taken as the torque angle. This angle is positive during motoring in the forward direction and negative during braking in the forward direction. The relative position of the flux/current vectors, i.e., positive or negative angle relationship, is compensated for by the FWD/REV signal applied to terminal 69 at torque processor 80. The FWD/REV signal causes the torque signal T to be inverted during reverse operation so that the signal T is always a positive value during motoring.

The stabilizing loop 70 is arranged so as to vary the stator excitation frequency as necessary to minimize the value of any error between a torque angle feedback signal representative of the actual phase angle and the command signal $\sin\theta_T^*$ that represents a desired phase angle. As previously described, the latter signal itself varies in a corrective sense in response to any non-minimum error between the actual motor torque feedback signal T on line 48 and the desired torque control signal T* at terminal 22 in the outer regulating loop 50 shown in FIG. 1. For deriving the angle feedback signal, suitable torque angle processing means is coupled to the motor 12. The angle processing means is shown in block form at 90 and can be constructed and arranged in accordance with the teachings of the aforementioned U.S. Pat. No. 4,088,934 issued to D'Atre et al on 9 May 1978.

The angle feedback signal that is derived by the processor 90 is supplied over a line 92 to summing means 93 where it is combined with the desired angle command signal from switch 53. In the summing means 93 these command and feedback signals are compared, and an error signal representative of their difference is derived. The error signal appears on a line 94 that is connected to the slip frequency line 71 by means of a gain circuit 95 having a proportional transfer characteristic. Thus the value of the slip frequency signal $\omega_{sl}$ is a function of any difference between the torque angle command and feedback signals.

The operation of the stabilizing loop 70 will now be reviewed. It is first noted that the frequency of the current exciting the stator windings of the motor is determined by the fundamental switching frequency of the electric valves in the inverter 14 and that variations in the latter frequency will transiently shift the stator current conducting intervals and hence the relative phase position of the stator current vector. More particularly, when the excitation frequency is increasing the stator current vector is advancing in phase (i.e., the angle of this vector is increasing in the positive sense with respect to a predetermined reference position), and when the excitation frequency is decreasing the phase of the current vector is being retarded (i.e., the angle is decreasing in the same sense or increasing in the opposite sense with respect to the predetermined reference position). It will next be assumed that the value of the desired torque control signal T* applied to the motor torque regulating loop 50 is suddenly reduced a predetermined amount from its steady-state rated-load forward motoring point. This causes an abrupt decrease in the angle command signal $\sin\theta_T^*$ and a corresponding decrement in the angle error signal on line 94, which decrement in turn is reflected by a proportionate reduction in the slip frequency signal $\omega_{sl}$ on line 71 and consequently by a step decrease in the excitation frequency control signal $\omega^*_e$. The firing controls 75 of the inverter 14 respond to the last-mentioned decrease by lowering the inverter switching frequency, whereby the fundamental stator excitation frequency is lowered. This reduces the motor slip frequency and in the process retards the angular position of the stator current vector with respect to the stator-rotor gap flux vector (i.e., reduces the torque angle). As a result, both the torque feedback signal on line 48 and the angle feedback signal on line 92 decrease in value, and the fundamental stator excitation frequency quickly reaches equilibrium at a new operating point wherein equality exists between the actual torque feedback signal and the value of torque commanded by the reduced control signal T* in the outer torque regulating loop 50 and wherein no more than a minimum difference exists between the angle feedback signal and the new value of the angle command signal in the inner stabilizing loop 70.

In a manner similar to that described above for a step change in the commanded value of the torque angle, the inner loop 70 responds to random changes of the actual angle feedback signal (due to anomalies or disturbances of any kind in the motor or in its connected load) by initiating a corrective variation in the stator excitation, whereby the proper angle is immediately restored. This prevents the motor from exhibiting self-sustained oscillations about a steady-state operating point. In effect the actual angular position of the stator current vector is caused spontaneously to track the desired angle command signal $\sin\theta_T^*$, and the system becomes self-synchronizing. From another viewpoint, the torque angle regulating effect of the inner loop 70 can be said to synchronize the firing signals of the inverter 14 (i.e., the actual current switching moments) to the stator-rotor gap flux and hence to the motor counter EMF, whereby the hunting type of instability is eliminated. For a more detailed description of a propulsion system using angle control, reference may be had to the aforementioned U.S. Pat. No. 4,088,934, the disclosure of which is incorporated herein by reference.

During motoring, i.e., when the motor 12 is used for propulsion, the switches 52 and 53 are so conditioned that the torque error signal is processed through a gain network 55 having integral plus proportional transfer characteristic, whereby a zero steady state error can be obtained. During electrical braking the switches 52 and 53 are conditioned such that the torque error signal is processed through another compensation network 56 having a transfer characteristic of the form $$\frac{K(S^2 + 2\zeta\omega_n S + \omega_n^2)(K_1 S + 1)}{(S + K_2)(S + K_3)S}$$

which will be recognized by those skilled in the art as a quadratic filter and integral plus proportional transfer function. The compensated signal is also processed through a summing network 58 which effectively increases the magnitude of the torque error during the transition from a motoring to a braking mode when the rate of flux change is relatively large and torque is relatively small. This increase in torque error signal magnitude effectively appears as an increase in the overall control loop gain.

Figure 3:
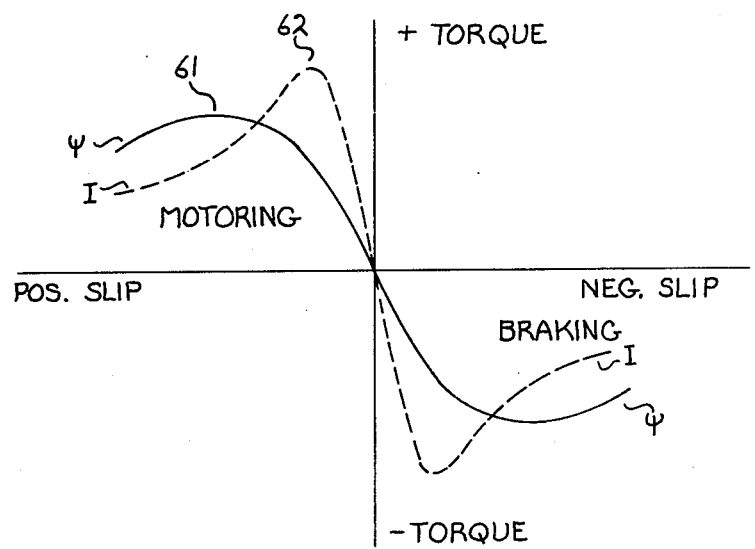
FIG. 3 is a graph showing variations in torque as a function of slip frequency for both a constant flux mode and a constant stator current mode of motor operation.

Referring for a moment to FIG. 3, there are illustrated typical torque versus slip curves for an a-c induction motor. Solid line 61 represents a torque slip response for constant flux operation and dashed line 62 represents a torque-slip response for constant current operation. When the motor is in a braking mode of operation, as described previously the excitation regulator nulls against current, i.e., the switch 31 is conditioned such that the current signal $|I|$ is coupled to junction 31a. As can be seen from the curve 62, during electric braking the torque increases relatively rapidly (in a negative direction) for small changes in slip frequency. In so doing, the air gap flux also increases very rapidly. As the control system attempts to regulate to a desired torque level during this transition, there may be a tendency for the control to regulate on the steep portion of the constant current curve which is undesirable because very small slip frequency changes result in large torque variations. Additionally, high torque in the low slip region is characterized by flux saturation, large transient currents and harmonic torque pulsations which may be detrimental to the motor. As is well known, the peak of the constant flux curve 61 generally occurs at pull-out slip frequency whereas the peak of the constant current curve 62 occurs at 20% or less of pull-out slip frequency. For example, in one motor operated in the illustrated system, pull-out slip frequency occurred at approximately 10 Hz whereas the peak of the constant current curve appeared at approximately 1½ Hz.

Accordingly, in order to facilitate the transition through this region when entering braking, the present system forces the control system to quickly transition to that portion of the constant current curve in which an increase in slip frequency (i.e., in a positive direction) will result in an increase in torque. The present system accomplishes this desirable result by varying the gain of the torque error responsive control loop by increasing the torque error signal primarily as a function of rate of change of flux up to a point at which rate of change of flux is relatively small and torque has reached an approximate desired level. At this point regulation is again able to track desired torque.

Referring again to FIG. 1, the compensation for torque error during the transition to electrical braking utilizes the flux signal $|\psi|$ from absolute value circuit 28 which is differentiated by derivative network 63 to produce a signal $|\dot\psi|$ representing the time rate of change of motor flux magnitude. A line 64 couples the $|\dot\psi|$ signal to a dividend input terminal of a divider circuit 65. A divisor input terminal of divider circuit 65 is connected for receiving a signal T' proportional to the torque developed by motor 12, noting that the sense of torque signal T is negative during electrical braking. The torque signal T' is provided through a limiter circuit 66 from torque processor 80. The limiter circuit 66 assures that the minimum value of T' will be greater than zero to prevent divide-by-zero difficulties.

Divider circuit 65 functions to divide the differentiated flux signal $|\dot\psi|$ by the torque signal T. A torque error compensation signal is thus developed by circuit 65, which signal is inversely related to actual motor torque and directly related to the time rate of change of flux. Accordingly, the torque error compensation signal is at a maximum during the transition period between motoring and braking. This output signal is summed with the torque error signal $T_e'$ in summing junction 58 to thereby yield a very large angle command signal $\sin\theta_T^*$ during the motor/brake transition. Thus, the system quickly forces the motor to transition through the low torque, rapidly changing flux zone and into a more stable operating area. In the stable operating zones, torque is relatively large and the rate of flux change is relatively small so that the signal added to the torque error signal $T_e'$ in summing junction 58 is negligible and the circuit comprising blocks 63, 65 and 66 can be ignored.

The switches 18, 31, 52 and 53 operate in response to a motor/brake (M/B) command signal applied to a switch control circuit 100. In the event that the switches 18, 31, 52 and 53 are electromechanical contactors, the circuit 100 would comprise suitable apparatus for supplying the power necessary to drive such contactors, all in a manner well known in the art. Alternately, if solid state switches are utilized, the circuit 100 would be suitably adapted to control such switches.

Describing briefly the operation of the system of FIG. 1, for a zero torque command, limiter circuit 40 provides a minimum excitation command signal thus maintaining a predetermined minimum value of motor excitation such that a corresponding minimum flux can be initially established in motor 12. A separate command signal from a control panel (not shown) controls the motor/brake (M/B) switches 52, 53, and 31 as a function of the desired operating mode of the system, i.e., an operator will call for either motoring or braking and that command will actuate the switches 52, 53 and 31 to place them in the correct position for the desired mode of operation. If electrical dynamic braking or retarding is desired, a control signal is applied to open switch 18 whereby regenerated current will be forced through braking resistor 17.

Assuming, for ease of illustration, that the disclosed system is applied to a traction vehicle (for example, a locomotive) wherein the motor 12 is connected in driving relationship to one or more wheels of the vehicle, an operator of the vehicle will command movement and direction by manipulation of the equivalent of a throttle and a direction control mechanism. A separate control mechanism may be provided for commanding a motoring or braking mode of operation, which control mechanism energizes the switches 52, 53 and 31 to place their respective contacts in either a motoring (M) or a braking (B) position. Since both mechanical and electronic switches suitable for application to the function of switches 52, 53, and 31 are well known in the art, the details and actuating arrangements for these switches have not been illustrated.

When the operator commands motoring in a forward direction, a circuit is completed between the common terminals 51, 68 and 31a and the respective terminals marked M of the switches 52, 53 and 31. The forward (FWD) command signal is applied to terminals 69 and 76 of torque processor 80 and firing logic 75, respectively. Movement of the aforementioned throttle causes a torque command signal T* to be applied to terminal 22.

An increase in the torque command signal T* will result in an increase in the torque error signal $T_e$ on line 44. Since the flux level in motor 12 at startup is below a predetermined minimum value, gain compensation circuit 42 will not influence the $T_e$ signal which will therefore appear the same on line 49 as on line 44. As the switches 52 and 53 are in the motoring (M) position, the $T_e$ signal will be coupled through integral plus proportional amplifier 55 into the angle control loop 70 at summing junction 93 as hereinbefore described. The angle control loop 70 provides a signal $\omega_e$ to firing control means 75 which in turn adjust the triggering of the valves in inverter 14 in a manner to sequentially connect the stator windings of the motor 12 to the d-c link 15.

Triggering of the valves in inverter 14 causes stator current I to flow (due to the small initial excitation voltage $V_R$ established through limitor 40) and a resultant flux $\psi$ to be generated. The interaction between the flux $\psi$ and the stator current I creates a torque T in the motor 12 to cause its rotor to begin to rotate. The resulting signal $\omega_r$ is coupled into the excitation control loop 30 via function generator circuit 29. So long as $\omega_r$ is representative of a rotor angular velocity below a predetermined level, preferably the motor corner point speed, the function generator circuit 29 provides an output signal representative of a unity multiplier, which signal is coupled to the multiplier input terminal of multiplying circuit 25. The flux signal $|\psi|$ is coupled to the multiplicand input terminal of circuit 25 where it is multiplied by the circuit 29 output signal before being balanced against the stator current feedback signal $|I|$ in summing junction 23. The balancing of flux against stator current establishes a predetermined motor operating point as evidenced by the signal $\phi^*_c$ developed on line 38A which becomes an excitation command signal. In the motoring mode switch 31 is in the motoring (M) position and the excitation loop 30 compares the excitation command signal against the flux feedback signal $|\psi|$ to establish an error signal to control the voltage output $V_R$ and hence to alter the magnitude of stator current applied to motor 12 in a manner to adjust the air gap flux level to the desired value.

Within the torque control loop 50, the network 42 responds to the flux feedback signal $|\psi|$ to reduce the magnitude of the torque error signal $T_e'$ on line 49 as flux level increases to thereby decrease the gain of the control loop 50. The torque processor 80 computes from the flux signal $\psi$ and stator current signal I the magnitude of torque produced by the motor 12 and generates a torque signal T which is summed with the torque command signal T* to yield the torque error signal $T_e$. Since the switches 52 and 53 are both in the motoring (M) position, the modified torque error signal $T_e'$ is coupled through integral plus proportional amplifier 55 into the angle control loop 70. Control loop 70 operates as described above and in the aforementioned U.S. Pat. No. 4,088,934 to a just the angle between the flux $\psi$ vector and the stator current I vector in a manner to minimize the torque error signal.

When the motor 12 is called upon to operate in an electrical retarding mode, the switches 52, 53, and 31 are moved into the braking (B) position. In the excitation control loop 30 the excitation command signal $\phi_c^*$ is now nulled against the magnitude of excitation current rather than the magnitude of flux in the motor 12. In the torque control loop 50, the flux signal $|\psi|$ is differentiated in circuit 63, divided by magnitude of torque T in circuit 65 and added to the modified torque error signal from circuit 66 in summing junction 58. Such action results in a relatively large error signal being generated during the motor-to-brake transition when flux is rapidly changing and forces the operating point for which the control is searching to be quickly established on a stable portion of the torque/slip characteristic.

During electrical retarding the switch 18 is opened by conventional means thereby forcing current in the d-c link 15 to pass through the dynamic brake resistor 17. The d-c power supply 13 modulates the resistor 17 by adjusting the voltage $V_R$ in response to the excitation regulation loop 30. An increase in the magnitude of $V_R$ makes the effective value of resistor 17 appear smaller, i.e., the impedance reflected to the d-c terminal set of inverter 14 is effectively decreased. At high speeds and at rated horsepower of the motor 12, the supply 13 is off, i.e., $V_R$ is at zero, and the effective impedance at the d-c terminal set of the inverter 14 is the value of the resistor 17. As the rotor speed of the motor 12 decreases below the constant horsepower characteristic, d-c supply 13 increases the $V_R$ voltage effectively modulating the resistor 17 whereby the impedance reflected to the d-c terminal set of inverter 14 is decreased, thus allowing constant retarding torque to be produced to a virtual standstill.

The system thus described controls the magnitude of excitation applied to the motor 12 by balancing the air gap flux developed in the motor against the stator current whereby a preferred motor operating response characteristic is achieved for any commanded level of motor torque. In addition, the system obviates the need for prior determination of its operating point on the selected response characteristic curve by switching from a flux regulation to a current regulation mode upon transitioning from motoring mode to braking mode. Furthermore, the system forces a rapid shift through an unstable, low slip operating point to a more stable and normal operating point during the motoring to braking transition by modifying the torque error signal in response to the rate of increase of flux magnitude and the magnitude of motor torque. Still further, the system includes apparatus for varying the gain of the torque error control loop as a function of flux levels in the motor 12 whereby the motor response to a torque command signal is optimized. Each of these enumerated improvements results in a more responsive induction motor control system, particularly in combination with the illustrated current fed inverter torque angle control system.

While specific embodiments of our invention have been shown and described by way of illustration, various modifications will probably occur to those skilled in the art. For example, where the description and drawings imply that the disclosed circuits or their functions are implemented using analog techniques, it will be understood that the same results could alternatively be achieved using digital techniques, including microprocessor or minicomputer implementation. We therefore intend, by the concluding claims, to cover all such modifications as fall within the true spirit and scope of the invention.

What we claim as new and desired to secure by Letters Patent of the United States is:

1. In a control system for an a-c electric motor comprising a stator and a rotor and provided with a source of excitation comprising electric power conversion apparatus that supplies a-c power of variable frequency and magnitude to the stator, the motor being capable of developing electromagnetic torque tending to move the rotor relative to the stator due to interaction of current and flux in the motor when excited, the control system including a first control loop for controlling the frequency of the a-c power in response to a command signal and a second control loop for controlling the magnitude of the a-c power, the improvement comprising means operative when the motor is in an electrical braking mode for varying the gain of the first control loop as a direct function of the rate of change of flux magnitude in the motor and as an inverse function of the magnitude of torque developed by the motor.

2. The improvement of claim 1 wherein said gain varying means comprises:
  a. means for deriving a flux signal representative of the magnitude of flux in the motor;
  b. means for deriving a torque signal representative of the torque developed by the motor;
  c. means for differentiating said flux signal to derive a first signal representative of the time-rate of change of said flux signal;
  d. means for dividing said first signal by said torque signal to produce a torque error compensation signal; and
  e. means for adding said torque error compensation signal into the first control loop to thereby vary the effective gain of the first control loop as a direct function of the magnitude of said first signal and an inverse function of the magnitude of said torque signal.

3. The improvement of claim 1 wherein the first control loop includes:
  a. means for deriving a torque signal representative of the torque developed by the motor;
  b. means for deriving a flux signal representative of the flux developed in the motor;
  c. first means for combining the command signal with said torque signal to derive a torque error signal;
  d. means for deriving a torque error compensation signal directly proportional to the time rate of change of said flux signal and inversely proportional to the magnitude of said torque signal;
  e. means for adding said torque error compensation signal to said torque error signal to thereby produce an error signal having a relatively large magnitude during initiation of electrical braking; and
  f. means responsive to said error signal for controlling the frequency of the excitation applied to the motor in a manner tending to minimize the error signal.

4. The improvement of claim 3 wherein said first control loop includes means for processing said torque error signal through a first path including a first filter network when the motor is operated in a motoring mode and through a second path including a second filter network when the motor is operated in an electrical braking mode, said second path including a summing junction for combining said torque error signal with said torque error compensation signal.

5. The improvement of claim 4 wherein said first filter network has an integral plus proportional transfer characteristic and said second filter network has a quadratic filter and integral plus proportional transfer characteristic.

6. The improvement of claim 2 and including means for limiting the minimum value of said torque signal at said dividing means to a value greater than zero.

7. A control system for an a-c electric traction motor including a source of adjustable frequency and adjustable magnitude a-c power comprising:
  a. means for deriving a flux signal representative of the magnitude of flux developed in the motor;
  b. means for deriving a torque signal representative of the magnitude of torque developed by the motor;
  c. a first control loop responsive to said flux signal for adjusting the magnitude of the a-c power to a desired value;
  d. a second control loop responsive to said flux signal and said torque signal for developing a signal for adjusting the frequency of the a-c power to a desired value; and
  e. means in said second control loop for varying the magnitude of the signal developed by said second control loop as a direct function of the rate of change of said flux signal and as an inverse function of the magnitude of said torque signal whenever the motor is operated in an electrical braking mode.

* * * * *